United States Patent
Tapocik

(10) Patent No.: US 10,441,052 B1
(45) Date of Patent: Oct. 15, 2019

(54) COMBINATION BLOW MOLDED BOTTLE RETAINED ON AND PARTIALLY RETAINED IN AN INJECTION MOLDED CONTAINER

(71) Applicant: Bryan Tapocik, Highland, CA (US)

(72) Inventor: Bryan Tapocik, Highland, CA (US)

(73) Assignee: TAP Holdings, LLC, Las Vegas, NV (US)

( * ) Notice: Subject to any disclaimer, the term of this patent is extended or adjusted under 35 U.S.C. 154(b) by 0 days.

(21) Appl. No.: 16/240,759

(22) Filed: Jan. 6, 2019

Related U.S. Application Data

(60) Provisional application No. 62/630,123, filed on Feb. 13, 2018.

(51) Int. Cl.
| | |
|---|---|
| B65D 23/08 | (2006.01) |
| A45D 34/04 | (2006.01) |
| B65D 8/00 | (2006.01) |
| B65D 6/34 | (2006.01) |
| B29L 31/00 | (2006.01) |
| B65D 47/06 | (2006.01) |
| A45D 34/00 | (2006.01) |
| B29C 65/58 | (2006.01) |
| B65D 23/00 | (2006.01) |
| B65D 21/02 | (2006.01) |

(52) U.S. Cl.
CPC .......... *A45D 34/045* (2013.01); *B65D 11/04* (2013.01); *B65D 11/26* (2013.01); *A45D 2034/007* (2013.01); *A45D 2200/053* (2013.01); *B29C 65/58* (2013.01); *B29L 2031/7158* (2013.01); *B65D 21/0233* (2013.01); *B65D 23/001* (2013.01); *B65D 47/06* (2013.01)

(58) Field of Classification Search
CPC .. B65D 23/001; B65D 23/08; B65D 23/0885; B65D 21/0233
USPC ....... 401/131; 215/10, 12.1, 12.2, 13.1, 370, 215/376, 395
See application file for complete search history.

(56) References Cited

U.S. PATENT DOCUMENTS

| | | | |
|---|---|---|---|
| 2,190,844 A | 2/1940 | Mills | |
| 3,156,279 A | 11/1964 | Grebowiec et al. | |
| 3,847,494 A | 11/1974 | Franklin | |
| 6,029,842 A | 2/2000 | Sheffler et al. | |
| 6,629,618 B1 | 10/2003 | Volan | |
| 6,923,347 B2 | 8/2005 | Winckels | |
| 8,016,157 B2 | 9/2011 | Norris et al. | |
| 8,439,223 B2 * | 5/2013 | Smith | B65D 23/001 215/376 |
| 8,453,860 B2 | 6/2013 | Otero | |
| 8,870,011 B2 | 10/2014 | Hammer et al. | |
| 9,924,776 B2 | 3/2018 | Schlatter et al. | |

* cited by examiner

*Primary Examiner* — David J Walczak
*Assistant Examiner* — Joshua R Wiljanen
(74) *Attorney, Agent, or Firm* — Thomas I. Rozsa

(57) ABSTRACT

A combination two primary section apparatus including a blow molded bottle first top section press fit partially retained within an interior chamber of an injection molded container second bottom section. The resulting present invention two-piece molded container has the aesthetically pleasing benefits of a container made of plastic but appearing to be made of glass. An upper top surface of the blow molded bottle first top section is visible while a bottom portion concealed by the injection molded container second bottom section is not visible.

18 Claims, 9 Drawing Sheets

COMBINATION BLOW MOLDED BOTTLE RETAINED ON AND PARTIALLY RETAINED IN AN INJECTION MOLDED CONTAINER

CROSS-REFERENCE TO RELATED APPLICATION

This patent application claims priority to Provisional Application No. 62/630,123 filed on Feb. 13, 2018.

BACKGROUND OF THE INVENTION

1. Field of the Invention

This invention is in the field of bottles. Specifically, this invention relates to plastic bottles which retain liquid substances and/or cosmetic products for dispensing from the bottle.

2. Description of the Prior Art

The following ten patents are the closest prior art known to the inventor:

1. U.S. Pat. No. 2,190,844 issued to Wallace C. Mills on Feb. 20, 1940 for "Metallic Container" (hereafter the "Mills Patent");

2. U.S. Pat. No. 3,156,279 issued to Michael J. Grebowiec et al. on Nov. 10, 1964 for "Double-Wall Jar" (hereafter the "Grebowiec Patent");

3. U.S. Pat. No. 3,847,494 issued to Ernest Franklin on Nov. 12, 1974 for "Coupling Mechanism for Tubular Elements" (hereafter the "Franklin Patent");

4. U.S. Pat. No. 6,029,842 issued to Robert J. Sheffer et al. on Feb. 29, 2000 for "Cosmetic Jar with Transparent Cover and Hidden Threads" (hereafter the "Sheffler Patent");

5. U.S. Pat. No. 6,629,618 issued to Ken Michael Volan on Oct. 7, 2003 for "Thermally Insulated Glass Bottle" (hereafter the "Volan Patent");

6. U.S. Pat. No. 6,923,347 issued to Mathlide Winckels on Aug. 2, 2005 for "Assembly for Packaging a Product; Especially a Cosmetic Product" (hereafter the "Winckels Patent");

7. U.S. Pat. No. 8,016,157 issued to Joseph Thomas Norris et al. on Sep. 13, 2011 for "Dispenser" (hereafter the "Nornss Patent");

8. U.S. Pat. No. 8,453,860 issued to Efrain Otero on Jun. 4, 2013 for "Bottle with Ratcheting Base and Inner Bladder" (hereafter the "Otero Patent");

9. U.S. Pat. No. 8,870,011 issued to Karen Hammer et al. on Oct. 28, 2014 for "Refillable Container System and Method for Assembly" (hereafter the "Hammer Patent").

10. U.S. Pat. No. 9,924,776 issued to Gary Schlatter et al. on Mar. 27, 2018 for "Container for a Cosmetic Product" (hereafter the "Schlatter Patent").

The Mills Patent discloses having one cup inserted inside another cup but not does describe the unique features of the present invention of the combination blow molded upper portion extending into and affixed to an injection molded second section.

The Grebowiec Patent discloses a double walled jar. One jar fits within the other jar and there is no dome top to where any of the contents of the upper jar can be fully enclosed. Most important, the concept of this patent teaches away from your innovation because referring to Column 2 Line 11 through 13 the patent states:

"At 11 is generally designated the outer shell of the double walled plastic jar. Outer shell 11 is preferably blow molded, including the threaded finish."

The patent further states on Column 1 beginning on Line 60 and continuing to Line 64: "However, preferably, it is circular in horizontal cross section. Inner shell 10 is preferably formed from a semi-flexible material which is regular or linear polyethylene. Also preferably, the inner shell is injection molded for precise shape and volume control."

Therefore, the disclosure in this patent is exactly the opposite of the present invention in that the interior chamber is injection molded and the exterior container is blow molded.

The Franklin Patent discloses the concept of having an interior container retained within an exterior container but does not have the unique features of the present invention.

The Sheffler Patent discloses the features of a jar with a jacket which are closely threaded to each other and have interlocking means in the form of an annular exterior on the wall of the jar, which is received in an annular groove of the jacket wall. However, the unique features of the present invention are not disclosed in the Sheffler Patent.

The Volan Patent discloses:

"A thermally insulated glass bottle is provided as an insulated glass bottle made from glass with an interstitial space in the sides and bottom. The sides and bottom of the glass are double-walled, forming an interstitial space for insulating purposes. The interstitial space can be left filled with air, or filled with an insulating material such as Styrofoam. The interstitial space not only reduces or eliminates condensation from forming on the exterior of the glass when filled with cold liquid on hot, humid days, but it also helps keep the liquid cooler."

This is different from the present invention.

The Winckels Patent also discloses the concept of having one container retained within a second container but is completely different from the present invention.

The Norris Patent discloses a dispenser. Specifically, the patent discloses: "The dispenser is comprised of a first hollow body and a second hollow body. The second hollow body fits into the first hollow body. The second hollow body has a closure at the open end. The second hollow body is maintained in the first hollow body by means of an interference fit. There also is at least one vent between the first hollow body and the second hollow body. The second hollow body will contain a medicament. In use the first hollow body and the second hollow body are separated, the lid on the closure of the second hollow body opened and a tablet dispensed into the first hollow body. A liquid such as water is added to the first hollow body to dissolve the tablet. This dissolved medicament is ingested in the usual way and the second hollow body placed back into the first hollow body."

The entire concept of this patent is different from the present invention.

The Otero Patent discloses a bottle with a ratcheting base and an inner ladder. The disclosure in this patent is completely different from the unique features of the present invention.

The Hammer Patent discloses the concept of an affixing mechanism by which an outer container is releasably connected with an inner container. However, the features of this prior art patent are totally different from the present invention.

The Schlatter Patent discloses a container for a cosmetic product. This patent discloses a two-component container wherein the contents are in the bottom of the container and are covered by the top to conceal it. The top is removable to gain access to the bottom of the container where the cosmetic contents are retained. Therefore, this patent is different from the present invention.

Therefore, based upon the prior art search conducted, there is no prior art that would identically disclose or in any combination make obvious the unique features of the present invention as described in this patent application.

SUMMARY OF THE INVENTION

The present invention is a combination container having a blow molded, partially visible upper and outer blow molded bottle that is tightly press fit retained within a stronger injection molded lower and outer opaque bottle. The present invention is also a combination blow molded container retained on and partially retained in an injection molded container.

It has been discovered that when a container is blow molded, it provides an appearance of glass even though the container is blow molded out of plastic. This provides a very attractive image to a potential customer and further, can be blow molded so that a portion of the contents is visible to give an appearance that more substance is contained within the blow molded container.

It has further been discovered that a blow molded bottle is generally unstable when placed on a horizontal surface. It has further been discovered that the blow molded bottle needs to be retained on, or in, or at least partially on and partially in an injection molded container or base which is stabile.

It is an object of the present invention to provide a combination bottle and container which has an outer body that resembles glass, while still maintaining rigidity and strength.

It is an additional object of the present invention to provide a container having an upper portion which is blow molded and partially extends into a lower portion that is injection molded which thereby gives the appearance of one large container even though it is a container formed in two separate sections made by two separate processes but provides an appearance of contents in the upper blow molded portion being greater than the actual amount of contents that is within the container.

It is a further object of the present invention to have a blow molded bottle which appears to contain more liquid or other contents than it actually contains due to its partial retention in an opaque injection molded container. In addition, this is accomplished by having a double walled plastic structure that provides thickness and strength to the blow molded container while reducing the amount of volume retained in the blow molded portion.

It is an additional object of the present invention to provide a container that provides a solution to the inability for a double walled plastic container to be injection molded as a one-piece container.

It is a further object of the present invention to provide a blow molded high strength plastic bottle that snaps onto an injection molded container. The injection molded container has a bottom and a circumferential wall and open top or at least partially open top. The body of the blow molded bottle is inserted into the injection molded container through the open top.

Once the blow molded bottle is formed, contents are injected into the interior chamber of the blow molded bottle in one of two ways: (1) contents are injected through an opening in the nozzle of the blow molded container; or (2) an insert is placed into the opening in the nozzle of the blow molded bottle and contents are inserted through an opening in the insert. The blow molded bottle has an exterior rim which is snap fit retained onto an upper exterior rim of the circumferential sidewall of the injection molded container. The upper portion of the bottle is visible but the remainder of the blow molded bottle within the injection molded container is not visible. The lower exterior wall of the blow molded bottle is also preferably opaque The upper portion of the blow molded bottle is preferably transparent Therefore, from an exterior view, the combined blow molded bottle and injection molded container appear to have a greater volume of contents while actually, only the blow molded bottle contains a substance such as liquid or cream.

It is a further object of the present invention to not use glue or adhesive to connect the blow molded bottle and the injection molded container together since they can negatively react with the plastic or the ingredients held within the inside bottle and ruin the contents. Therefore, they are mechanically retained together without the use of adhesive.

A preferred shape for the present invention is a blow molded bottle having a rounded dome-shaped top having a generally cylindrical-shaped nozzle and the lower injection molded container having a round upper rim with a flat bottom wall and in one example, four upwardly and outwardly expanding outer walls. However, it is within the spirit and scope of the present invention for both the blow molded upper container and the injection molded lower container to have a generally vertical shapes which are selected from the group consisting of triangular, round, cylindrical, or any polygonal shape selected from the group consisting of pentagonal, hexagonal, octagonal and any other multi-sided shape.

The vertical shape of the upper portion is consistently the same shape and is progressively dome-shaped extending to a vertical nozzle entering into the interior of the dome-shaped top. However, the remaining portion of the blow molded upper container can be any other desired shape as identified above. The injection molded lower portion will match the lower physical shape of the blow molded portion into which the blow molded portion is inserted. The injection molded bottom section will have a shape to match the shape of the blow molded lower section. The injection molded bottom section has a flat bottom wall with sidewalls to match the shape of the bottom section, with the sidewalls being vertical or outwardly sloped vertical as discussed above.

Defined in detail, the present invention is an apparatus comprising: (a) a blow molded bottle top first section and an injection molded container second bottom section; (b) said blow molded bottle top section including a blow molded upper portion having a blow molded upper surface that extends to a cylindrical vertical nozzle having an exterior wall that contains threads, the cylindrical vertical nozzle exterior wall having a top wall that surrounds an opening leading to a cylindrical nozzle vertical interior wall surrounding a cylindrical vertical nozzle interior chamber that connects to a first interior chamber of the blow molded bottle top section, an insert having a top shelf resting on the top wall of the cylindrical vertical nozzle, the insert including at least one wall press-fit retained against the cylindrical nozzle vertical interior wall, the insert including a vertical interior opening which also connects to said first interior chamber; (c) the blow molded bottle top section includes the blow molded upper portion extending to a blow molded edge which surrounds a blow molded vertical wall forming a blow molded shelf which extends to a blow molded lower portion including a curved wall section and a straight wall section terminating in a flat bottom wall, a blow molded bottle top section interior chamber is surrounded by interior walls of the blow molded upper portion, the blow molded lower portion, and an interior surface of the flat bottom wall; (d) said injection molded container second bottom section including an injection molded bottom wall and an injection molded circumferential sidewall extending to a top circumferential rim, the injection molded bottom wall and the injection molded circumferential wall surround an interior chamber leading to an open top surrounded by the top circumferential rim; (e) the lower portion of the blow molded bottle top section extending into said top opening of and is retained in said interior chamber of said injection molded second bottom section, the blow molded bottle top section and injection molded bottom section are retained together with the blow molded shelf resting on the top circumferential rim; and (f) said injection molded container second bottom section includes adjacent its bottom wall four vertical prongs that pinch and retain a base of the bottom portion of the blow molded top section.

Defined more broadly, the present invention is an apparatus comprising: (a) a blow molded bottle first top section and an injection molded container second bottom section; (b) said blow molded bottle first top section has a blow molded lower portion and a blow molded upper portion with said blow molded lower portion and said blow molded upper portion integrally formed together; (c) said blow molded upper portion including a blow molded top surface that extends upward to a nozzle having a central opening with a stabilizing insert retained in the central opening, said stabilizing insert including a longitudinal opening leading to an interior chamber of the blow molded bottle first top section; (d) said blow molded top surface also extends to a top surface edge which extends to a blow molded underneath shelf; (e) said blow molded lower portion has an arced vertical wall extending to a straight vertical wall terminating in a bottom horizontal wall; (f) interior surfaces of each of said blow molded lower portion bottom horizontal wall, straight vertical wall, arced vertical wall, and said blow molded top surface together surround a first interior chamber; (g) said injection molded container second bottom section including an injection molded circumferential wall terminating in a top circumferential rim and an injection molded bottom wall, the injection molded circumferential wall and injection molded bottom wall surround a second interior chamber; (h) said lower blow molded portion of said bottle retained in said second interior chamber of said injection molded container, the top surface of said blow molded bottle first top section extending above said top circumferential rim of the injection molded circumferential wall; (i) the upper portion of said blow molded bottle first top section is visible and the lower portion of said blow molded bottle first top section is not visible through the injection molded circumferential wall of the injection molded container second bottom section when the blow molded bottle first top section and injection molded container second bottom section are retained together; and (j) a vertical height of the interior chamber of the injection molded container second bottom section is greater than a vertical height of the lower portion of said blow molded first top section.

Defined most broadly, the present invention is an apparatus comprising: (a) a blow molded bottle first top section and an injection molded container second bottom section; (b) said blow molded bottle first top section has a blow molded lower portion and a blow molded upper portion with said blow molded lower portion and said blow molded upper portion integrally formed together; (c) said blow molded upper portion including a blow molded top surface that extends to a nozzle having a central longitudinal opening leading to an interior chamber of the blow molded bottle first upper section; (d) said blow molded upper surface also extends to a top surface edge which extends to a blow molded underneath shelf; (e) said blow molded lower portion has a bottom wall extending to sidewalls which surround a first interior chamber; (f) said injection molded container second bottom section including an injection molded circumferential wall terminating in a top circumferential rim and an injection molded bottom wall, the injection molded circumferential wall and injection molded bottom wall surround a second interior chamber; (g) said lower blow molded portion of said blow molded bottle top section retained in said second interior chamber of said injection molded container, the top surface of said blow molded bottle first top section extending above said top circumferential rim of said injection molded container second bottom section; and (h) the upper portion of said blow molded bottle first top section is visible and the lower portion of said blow molded bottle first top section is not visible through the circumferential wall of the injection molded container second bottom section when the blow molded bottle first top section and injection molded container second bottom section are retained together.

Therefore, because of the greater height of the interior chamber of the injection molded second bottom section, the combined two-component container provides an appearance of having a greater amount of contents than is actually contained within the interior chamber of the first top section.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

Blow molding is a specific manufacturing process by which hollow plastic parts are formed and can be joined together. It is also used for forming glass bottles or other hollow shapes. Blow molding is a technique for making hollow objects, such as bottles, by injecting air under pressure into a molten mass of glass or plastic and shaping the object within a mold. The process as just described is an example of how the blow molded top bottle section 50 (see FIG. 1) is made. The material out of which the blow molded top bottle section 50 of the present invention is made is selected from the group consisting plastic and glass.

Injection molding is a manufacturing process for producing parts by injecting molten material into a mold cavity where the molten material cools and hardens to the configuration of the cavity. Molds are usually made of steel or aluminum. The part is formed in one part or two parts on either side of the mold and manufactured and machined together after being removed from the mold. Injection molding is performed using materials selected from the group consisting of thermoplastic and thermosetting polymers, elastomers and glass. The injection molded container bottom section 120 (see FIG. 1) of the present invention is made out of one or more of these materials.

Figure 1:
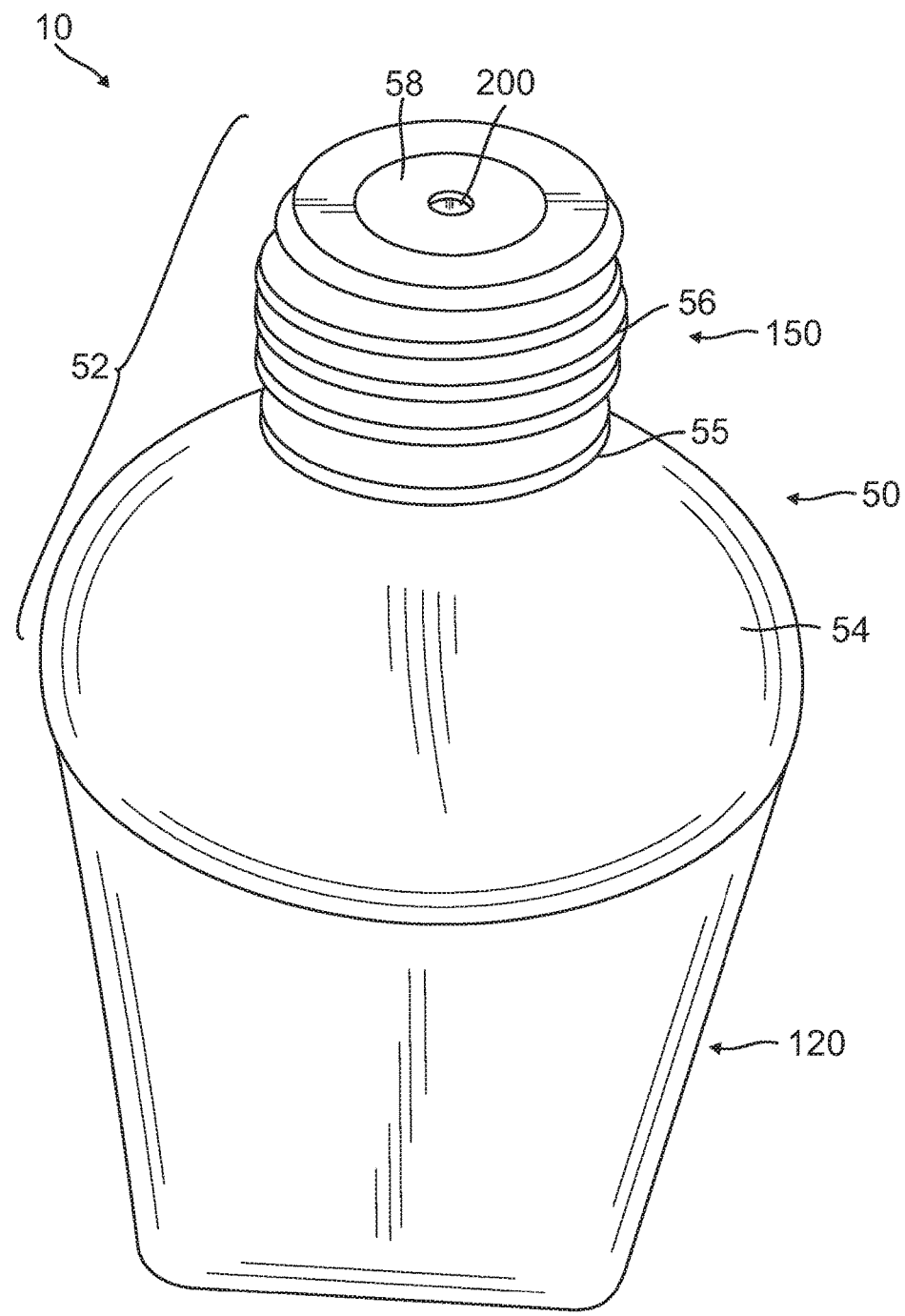
FIG. 1 is a front and top perspective view of the completed present invention top or upper blow molded bottle section forming a first section press fit or snap fit retained onto the second section outer injection molded container, with the nozzle insert in place in the nozzle opening of the blow molded bottle.

Referring to FIG. 1, there is illustrated a front and top perspective view of the present invention two major component container 10 with the blow molded top bottle first section 50 located above and press fit retained within the injection molded container second bottom section 120. Blow molded bottle top section 50 is tightly press fit retained and/or snap fit retained and cannot easily be removed from injection molded container second bottom section 120. The rigid press fit connection will be described in greater detail below. In FIG. 1, the stabilizing insert is retained in the opening 58 of nozzle 150.

Blow molded bottle top section 50 has a blow molded upper portion 52 that extends into a circular vertical nozzle 150 having an exterior wall 55 that contains threads 56 and surrounds an opening 58 that connects to a first interior chamber surrounded by blow molded rounded upper surface 54 where liquid or contents of the present invention two major part container 10 are stored. A plastic nozzle insert 200 is press fit retained in opening 58 of nozzle 150. The purpose of the plastic nozzle insert 200 is to reduce the opening size in the nozzle to accommodate the stem of an applicator inserted into the interior of the blow molded bottle top section 50.

Figure 2:
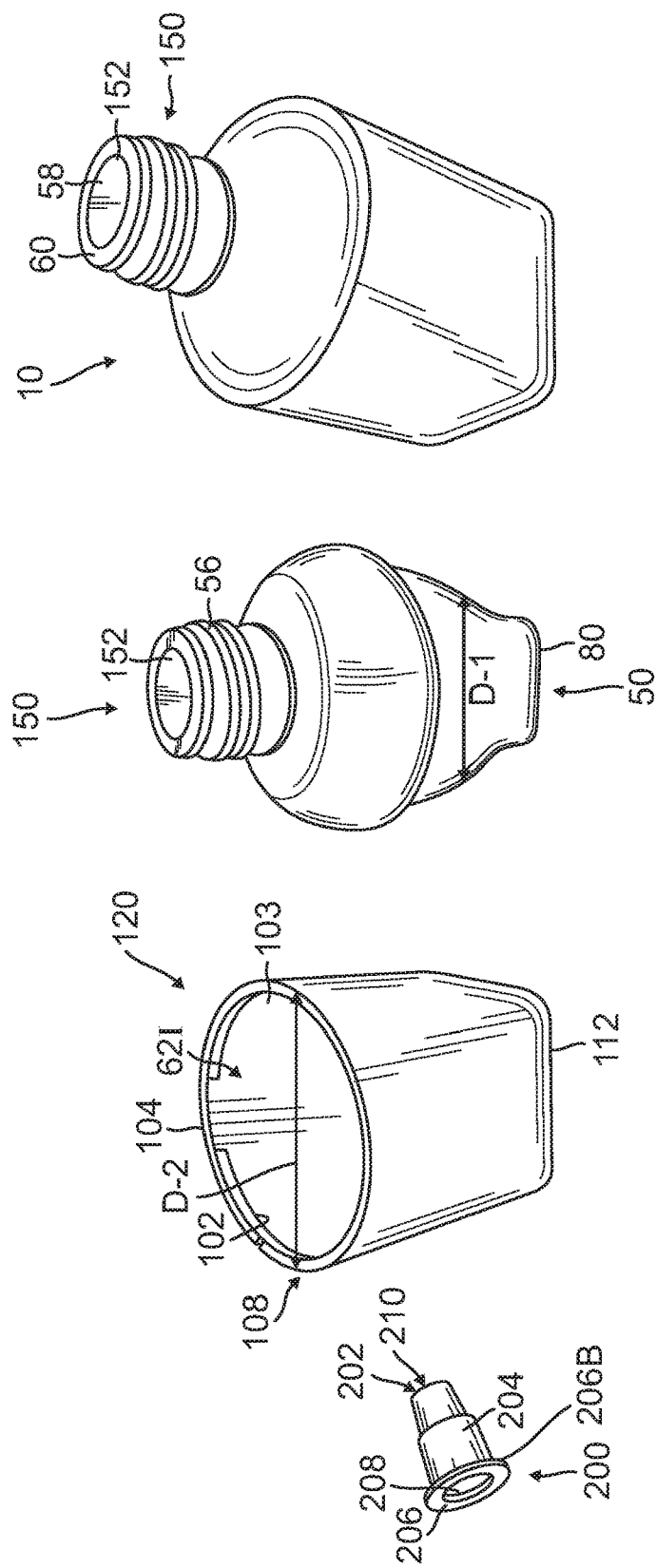
FIG. 2 is a separated view of the nozzle insert on the left, the injection molded container illustrated in the second from the left image, the blow molded bottle without the nozzle insert in the second from the right image, and the final combined two major component container with nozzle insert not in place illustrated on the right hand side to illustrate the wide opening in the nozzle of the blow molded bottle before the nozzle insert is inserted.

Referring to FIG. 2, there is illustrated a separated view of the present invention. From left to right, the leftmost view is of an insert 200. The details of the insert will be discussed in succeeding paragraphs. Also illustrated in FIG. 2 are the two major components of the present invention, namely the injection molded container second bottom section 120, the blow molded bottle first top section 50, and the completed assembled press fit together two major component containers 10 with the insert 200 not in nozzle opening 58. The nozzle insert is illustrated on the leftmost portion of FIG. 2. The view on the extreme right of FIG. 2 shows the opening 58 in the nozzle 150 of the blow molded bottle portion 50. As illustrated in FIG. 1 and FIG. 2, injection molded container bottom section 120 and blow molded top section 50 are press fit together to form the two major component container 10.

Figure 3:
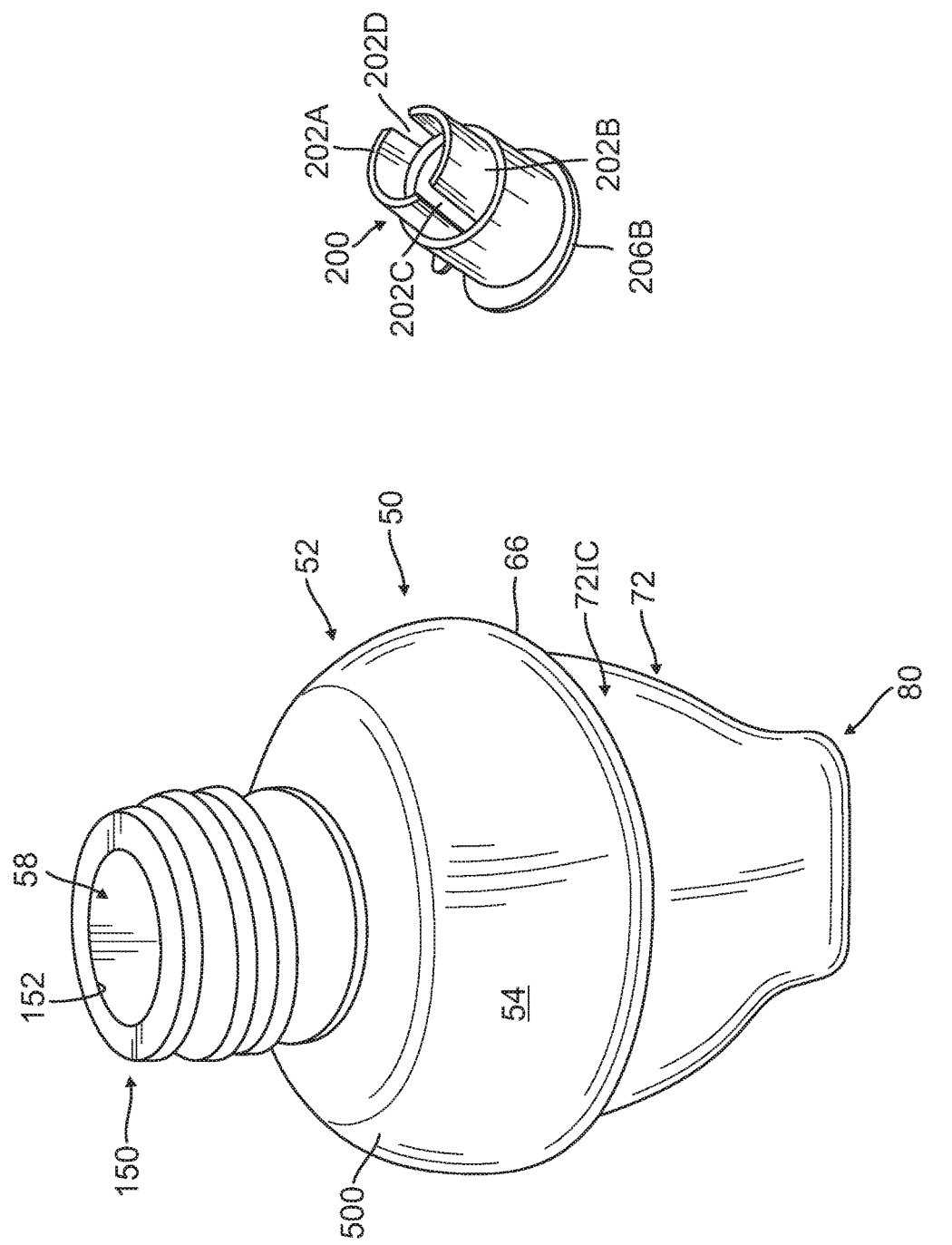
FIG. 3 is a separated view including a top perspective view of the blow molded bottle top section without the plastic nozzle insert inside the nozzle opening, the blow molded bottle being one of the two major components located on the left side, and a bottom perspective view of the plastic nozzle insert on the right hand side.
Figure 3A:
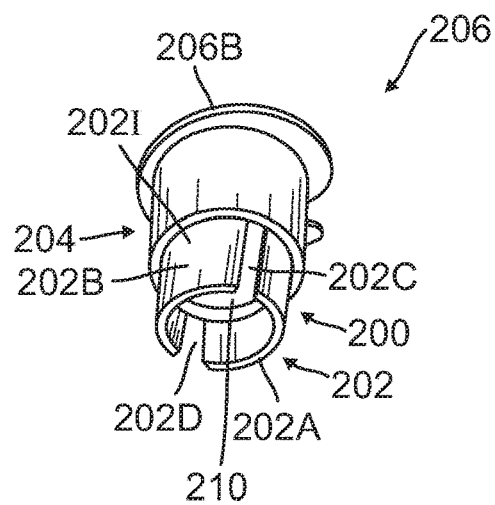
FIG. 3A is an exploded perspective view of the blow molded bottle without the plastic nozzle insert inserted into the nozzle opening and the specific plastic nozzle insert located above the opening of the nozzle of the blow molded bottle into which the plastic nozzle insert will be retained.
Figure 3A:
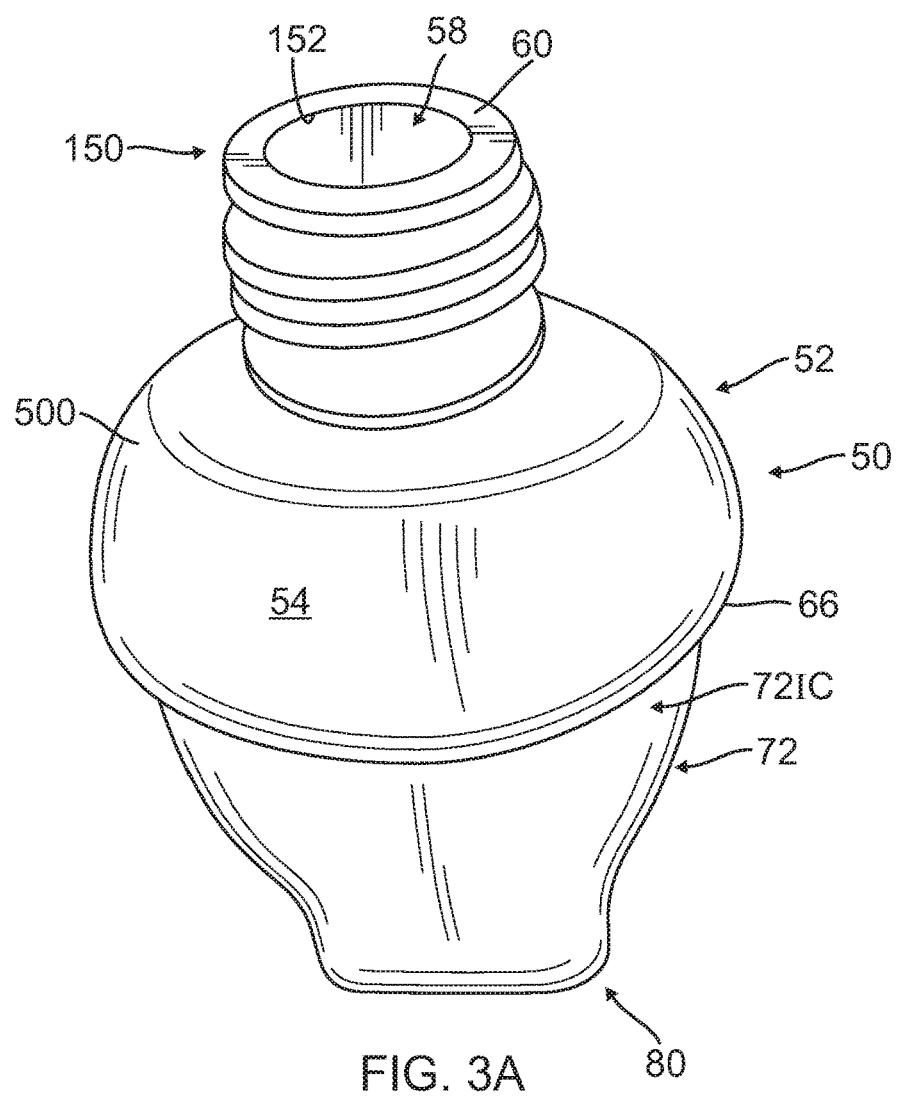

Referring to FIG. 2, there is illustrated on the left side, a front side perspective view of the insert 200. Referring to FIG. 3, there is illustrated a top perspective view of the blow molded bottle top section 50 without the plastic nozzle insert 200 inside the nozzle opening 58. Referring to FIG. 3, the blow molded bottle being one of the two major components of the present invention is illustrated on the left side, and a bottom perspective view of the plastic nozzle insert is illustrated on the right hand side of FIG. 3. Referring to FIG. 3A, there is illustrated an exploded perspective view of the blow molded bottle 50 without the nozzle insert 200 inserted into the nozzle opening 58 and the specific nozzle insert 200 (which is made of material selected from the group consisting of blow molded plastic and plastic) located above the opening 58 of the nozzle 150 of the blow molded bottle into which the plastic nozzle insert 200 will be retained As illustrated in FIGS. 2, 3 and 3A, the nozzle insert 200 has a pair of cylindrical walls, a lower cylindrical wall 202 integrally formed with an upper cylindrical wall 204 which terminates in an upper shelf 206 which surrounds an opening 208 leading to interior chamber 210 surrounded by both cylindrical walls 204 and 202. Cylindrical wall 204 is sized to be press fit into the opening 58 of nozzle 150. The shelf 206 is sized to sit on the upper rim 60 of nozzle 150 so that the bottom of the shelf 206B rests on the rim 60 while the upper cylindrical wall 204 is press fit inside the interior surface 152 of nozzle 150. The diameter of cylindrical portion 204 is greater than the diameter of cylindrical portion 202. In addition, as best illustrated in FIGS. 3 and 3A, the lower cylindrical portion is really in two sections, 202A and 202B so that it can be folded in on itself in the gaps 202C and 202D between sections 202A and 202B of insert section 202.

Figure 4:
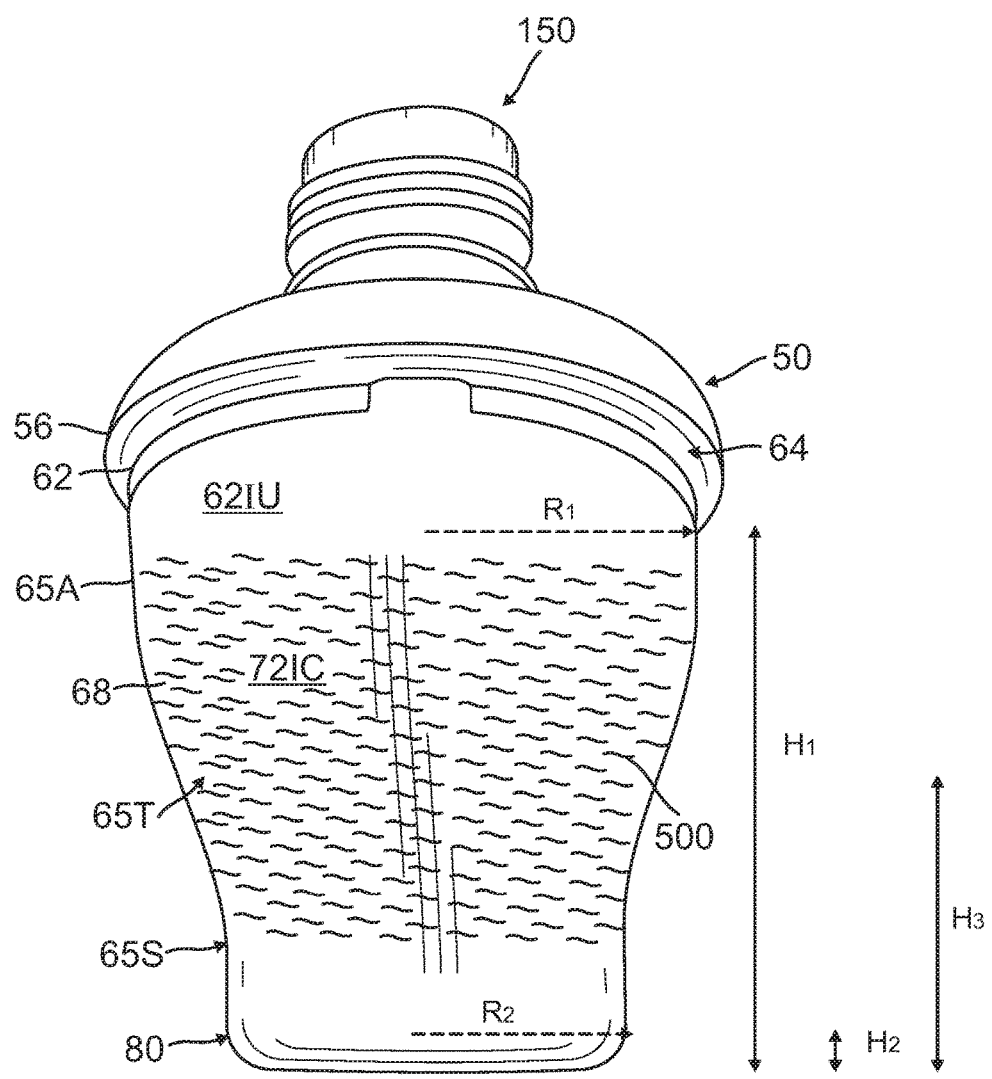
FIG. 4 is a side perspective view of the blow molded bottle top section of the two major component container, with the body of the blow molded upper section transparent to illustrate interior features.

Referring to FIG. 4, there is illustrated a side perspective view of the blow molded bottle top section 50 of the two major component container, with the body of the blow molded upper section 50 transparent to illustrate interior features and the contents 500.

Referring to FIGS. 2, 3, 3A and 4, once the blow molded first top section 50 is fully formed including the blow molded upper portion 52 and the blow molded lower portion 72, the contents 500 are inserted inside of the interior chamber 72IC which is surrounded by the interior walls of the upper portion 52 and the lower portion 72. The contents 500 are inserted into the interior chamber 72IC through one of the two alternative methods: (i) The contents are injected through the opening 58 in the nozzle 150 of the top portion 52; or (ii) if the insert 200 is inserted into the opening 58, then the contents are inserted through the opening 208 in the insert 200 so that the contents 500 fills the interior chamber 72IC of the interior of the blow molded upper section 50. The contents 500 can be filled either at the factory or prior to distribution or by a distributor but either way, once the blow molded upper portion is fully formed, it is not possible to insert any contents into the interior chamber 72IC except through either the opening 58 or the nozzle opening 208. The insertion is usually done through an injection or other comparable method for inserting liquid into a chamber 72IC.

Referring to FIGS. 2, 3, 3A and 4, there is illustrated blow molded bottle first top section 50 having a blow molded upper portion 52 and a blow molded lower portion 72. Blow molded upper portion 52 has a curved blow molded top surface 54 that extends upward to a nozzle 150 having a central opening 58. The curved blow molded top surface 54 also extends downward to a top surface edge 66. Top surface edge 66 extends to a circular horizontal wall 62. When upper section 50 is inserted into lower section 120, the injection molded lower section 120 has an interior chamber 62I which is surrounded by a circumferential wall 102 with a top surface edge 104 of the injection molded bottom lower section 120. The second lower portion 72 of the upper section 50 forms a blow molded underneath shelf 64 with this combination. As will be discussed below, when the insertion is complete, there is actually a third opaque chamber beneath the bottom 80 of the blow molded lower portion 72 and the bottom wall 112 of the injection molded container second bottom section 120. As a result, since the circumferential wall 102 of the injection molded container second bottom section 120 is opaque, the contents of the lower portion 72 of upper section 50 cannot be seen and therefore, the contents 500 within the entirety of the upper section 50 appears to be larger because of this additional third chamber between the bottom 80 of first section 50 and the bottom wall 112 of second section 120.

Figure 5:
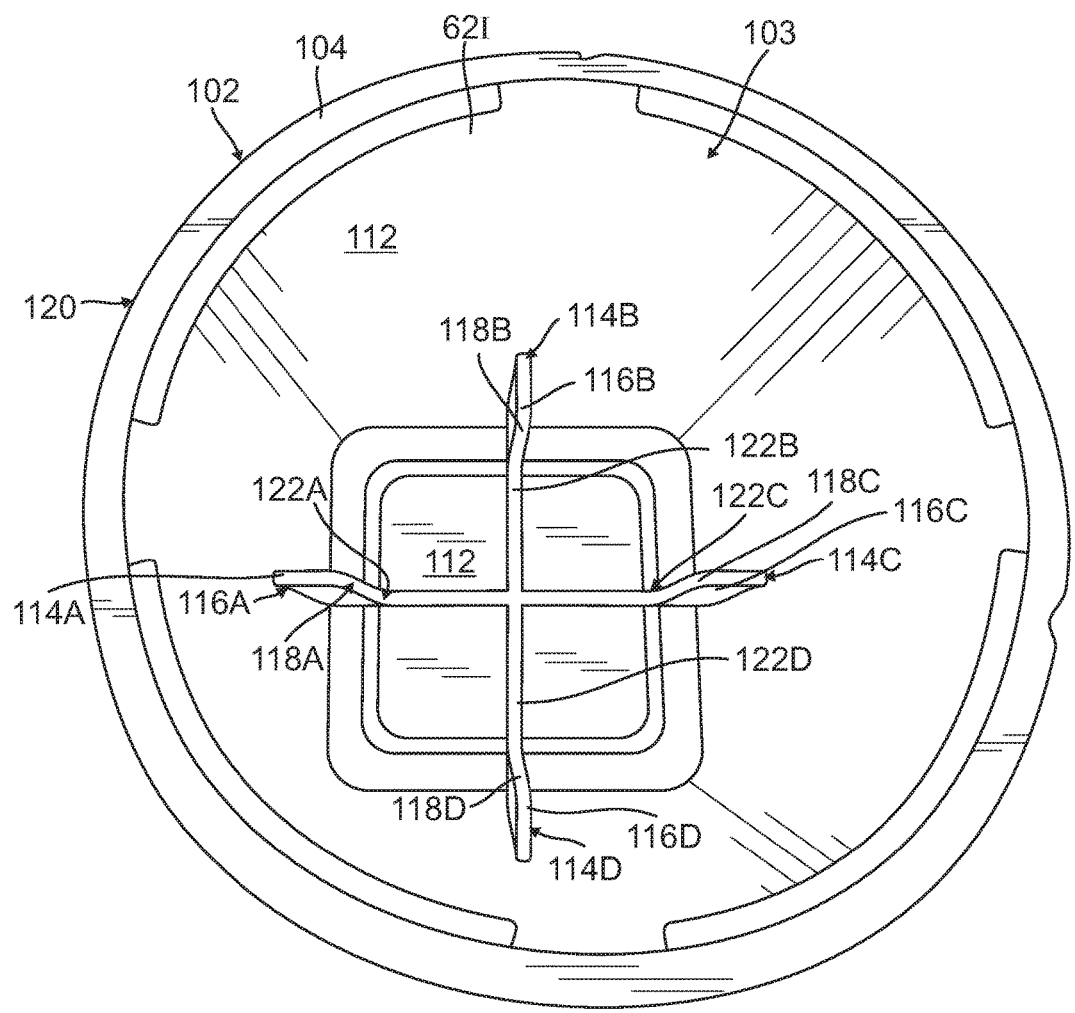
FIG. 5 is a top interior perspective view of the injection molded container bottom section of the two major component container.

Referring to FIG. 5, there is illustrated a top interior perspective view of the injection molded container bottom section 120 of the two major component container.

Referring to FIGS. 2 and 5, injection molded container second bottom section 120 has an injection molded bottom wall 112 and an injection molded circumferential wall 102 terminating in a top circumferential rim 104. The injection molded bottom wall 112 and the injection molded circumferential wall 102 surround interior chamber 62I leading to an open top 103 surrounded by the top circumferential rim 104. The lower portion 72 of first upper blow molded section 50 is inserted into top opening 103 and is retained in interior chamber 62I. When injection molded second bottom section 120 and blow molded bottle top section 50 are press fit together, blow molded underneath shelf 64 rests on top of circumferential rim 104.

Further referring to FIGS. 3, 3A, 4, and 5, blow molded lower portion 72 of blow molded top section 50 has a vertical circumferential wall 65A that surrounds first interior chamber 62IU and extends from blow molded underneath shelf 64 in a slightly arced vertical direction on each of the sides of lower portion 72 of blow molded bottle first top section 50 to a blow molded square base 80. The transition from the arced vertical wall near blow molded underneath shelf 64 to blow molded square base 80 is an inward transition such that the radius R1 at height H1 from the center of blow molded top section 50 to blow molded outer edge 68 is less than the radius R2 at height H2, located at blow molded base 80. Each radius is measured from the center of blow molded first top section 50 to blow molded outer edge 68. The arced vertical wall 65A transitions from an arced vertical wall to a straight vertical wall 65S with the center of the transition 65T and at an approximate height H3. Arced vertical wall 65A and straight vertical wall 65S are integrally formed together.

Referring to FIGS. 2 and 5, injection molded container bottom section 120 having an injection molded top circular section 108 with a diameter D-2 and an injection molded bottom square section 100 receives blow molded bottle first bottom section 72 having a maximum diameter D-1. The diameter D-1 of blow molded bottle first bottom section 72 is sized slightly smaller than D-2. Therefore, when blow molded bottle first bottom section 72 is inserted into injection molded container second bottom section 120, injection molded top circular section 108 expands slightly when diameter D-1 of the outer edge 68 of blow molded bottle first top section 50 presses injection molded top circular section 108 outwardly to receive blow molded bottle bottom section 72. The slight expansion of section 108 of injection molded container second bottom 120 during the one-way press fitting process assists in retaining blow molded bottle first top section 50 to injection molded container second bottom section 120.

Further referring to FIG. 5, to further create a stronger one-way press fit connection between blow molded bottle first top section 50 and injection molded container second bottom section 120, injection molded container second bottom section 120 has four vertical prongs 114A, 114B, 114C, and 114D that pinch and retain blow molded base (preferably square in shape) 80 when blow molded bottle first top section 50 and injection molded container second bottom section 120 are retained together.

Referring to FIG. 5, each of the four vertical prongs functions in the same way. The first the vertical prong 114A has a predominantly flat horizontal wall 116A that extends to a prong edge 118A. Prong edge 118A then extends predominantly vertically downwards and slightly towards outer circumferential vertical wall 102 of injection molded container second bottom section 120 and ends at prong bottom spacer wall 122A. The second vertical prong 114B has a predominantly flat horizontal wall 116B that extends to a prong edge 118B. Prong edge 118B then extends predominantly vertically downwards and slightly towards outer circumferential vertical wall 102 of injection molded container second bottom section 120 and ends at prong bottom spacer wall 122B. The third vertical prong 114C has a predominantly flat horizontal wall 116C that extends to a prong edge 118C. Prong edge 118C then extends predominantly vertically downwards and slightly towards outer circumferential vertical wall 102 of injection molded container second bottom section 120 and ends at prong bottom spacer wall 122C. The fourth vertical prong 114D has a predominantly flat horizontal wall 116D that extends to a prong edge 118D. Prong edge 118D then extends predominantly vertically downwards and slightly towards outer circumferential vertical wall 102 of injection molded container second bottom section 120 and ends at prong bottom spacer wall 122D.

Inside injection molded container second bottom section 120 and near injection molded bottom wall 112, two small vertical prong bottom spacer walls connect together the four vertical prongs at their respective prong bottoms to form an intersection. Prong bottom spacer wall 122A connects to prong bottom spacer wall 122C and prong bottom spacer wall 122B connects to prong bottom spacer wall 122D. Because prong edges 118A, 118B, 118C, and 118D extend closer to the center of injection molded container second bottom section 120, when blow molded bottle first top section 50 is inserted into injection molded container second bottom section 120, prong edges 118A, 118B, 118C, and 118D grasp and pinch the sides of blow molded square base 80 of blow molded lower portion 72 and make the present invention a predominantly one-way press fit connection.

It should also be noted that there is a third interior chamber located between injection molded bottom square section 80 and blow molded square base 112. The circumferential wall 102 is opaque. Therefore, the interior chamber 62IU cannot be seen by the user when the lower section 72 of the blow molded bottle first top section 50 is retained within the interior chamber 62I. The top surface 54 of blow molded bottle first top section 50 is transparent and contents 500 is visible through the top surface 54. Therefore, the two part container 10 provides an appearance of retaining more contents than is actually retained within interior chamber 62I.

By way of example only, the volume intended to be contained within the present invention is between 10 milliliters and 40 milliliters. However, it is within the spirit and scope of the present invention to hold more or less volume.

Figure 6:
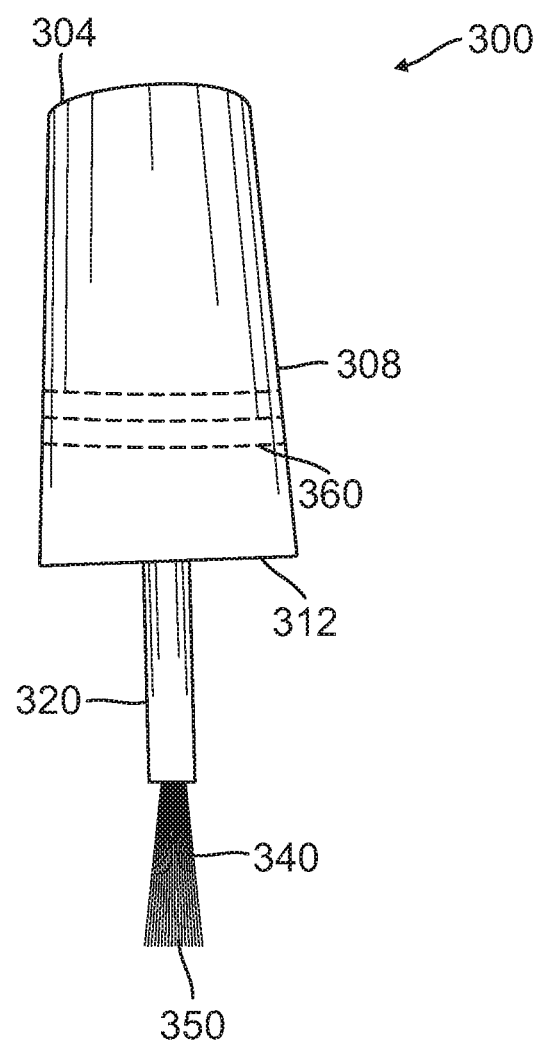
FIG. 6 is a side perspective view of an example of a top cover for the nozzle of the blow molded upper sectional, with a stem retaining a brush applicator which is inserted through the blow molded bottle nozzle insert and extends into the interior chamber of the blow molded bottle section to withdraw the contents from the interior chamber; with the top cover including threads shown in dashed lines.

Referring to FIG. 6, there is illustrated a side perspective view of an applicator. Referring to FIG. 6, insert 200 has an opening 208 (see FIG. 2) to receive a stem 320 of cap 300, the stem 320 terminating in an applicator which is a brush 340 with a tip 350. The brush 340 is inserted into the container to remove contents 500 (see FIG. 4). The contents can be any liquid such as perfume, nail polish, glue, or any other liquid that is applied with a brush or comparable instrument.

Specifically, the closing cap 300 includes a top 304 with a sidewall 308 and an interior chamber 312. The stem 320 extends through the interior chamber and ends in an applicator 340 which, by way of example, is a brush, having a tip 350. The cap sidewall 308 has an interior surface (not shown) which contains threads shown in dashed lines 360 which mate with the threads 56 on the nozzle 150.

Figure 7:
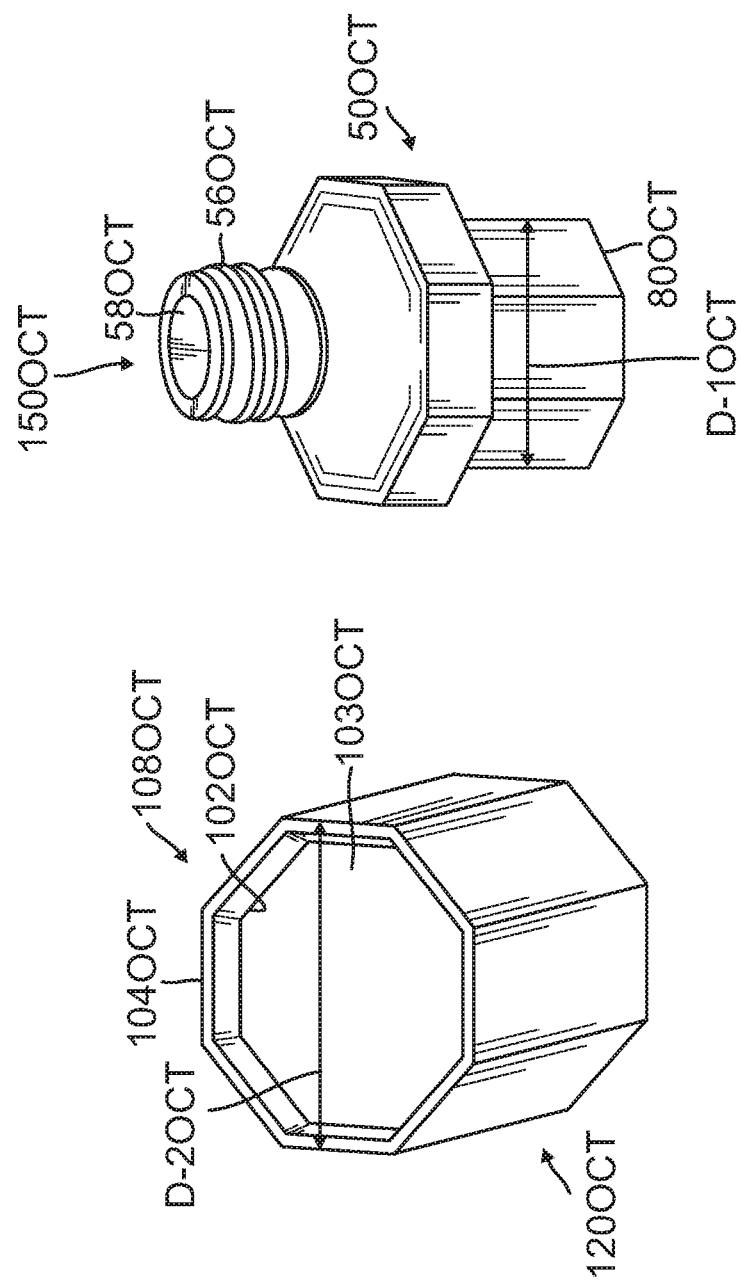
FIG. 7 is a top front perspective view of an alternative octagonal-shaped bottom injection molded section on the left and a top front perspective view of an alternative octagonal shaped upper blow molded section on the right.

It is within the spirit and scope of the present invention to have other shapes than what is illustrated that embody the principles of the present invention by having a blow molded upper section affixed to an injection molded bottom section. By way of example only, shown in FIG. 7 is a variation wherein the shape of the blow molded upper section 50OCT is octagonal and the shape of the injection molded lower section 120OCT is octagonal and they fit together with all the elements as set forth in the previous embodiments. Specifically, the parts that are identified are as follows. The bottom section 120OCT has an open top area 103OCT surrounded by an upper rim 104OCT with an interior diameter D-2OCT. The upper portion is designated as 108OCT. OCT stands for octagonal. It will be appreciated that this is representative of any polygonal shape such as pentagonal, hexagonal, octagonal, etc. Further, as illustrated on the right portion of FIG. 7, the upper blow molded portion which is 50OCT extends to the nozzle 150OCT with a nozzle sidewall or nozzle threads 56OCT and surrounding an interior opening 58OCT. The bottom wall is 80OCT. It will be appreciated that these are just representative numbers to show that the various shapes have the same physical components or interlocking components as the principal design as shown in FIGS. 1-6.

Figure 8:
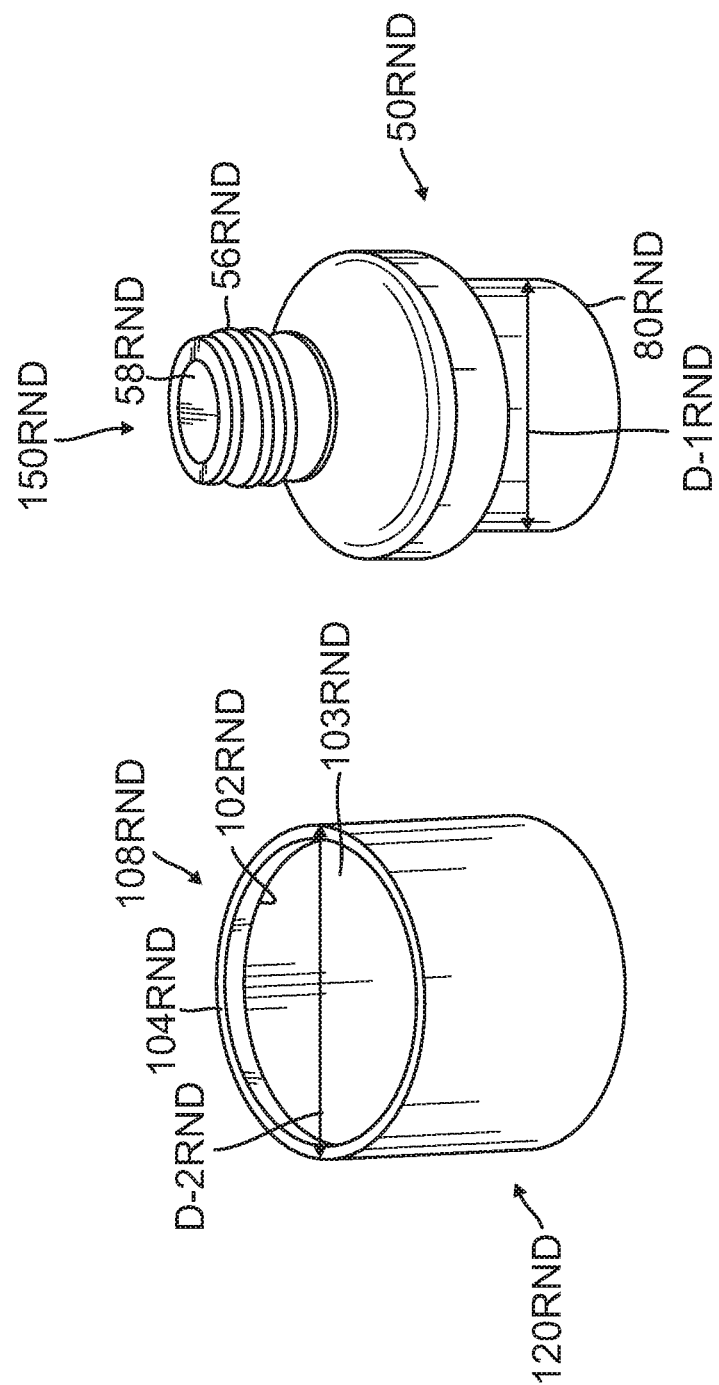
FIG. 8 is a top front perspective view of another alternative cylindrical bottom injection molded section on the left and a top front perspective view of another alternative cylindrical-shaped upper blow molded section on the right.

Further, with respect to FIG. 8, the embodiment is shown with a round blow molded upper section 50RND fitting into a round injection molded lower section 120RND. The numbers are all the same as shown in FIG. 7 with the letters RND after each number in FIG. 8 which are comparable to the numbers in FIG. 7 but have the letters RND at the end of each number which stands for "round".

Further, with respect to FIG. 8, the parts are as follows. The bottom section 120RND has an open top area 103RND surrounded by an upper rim 104RND with an interior diameter D-2RND. The upper portion is designated as 108RND. RND stands for round. Further, as illustrated on the right portion of FIG. 8, the upper blow molded portion which is 50RND extends to the nozzle 150RND with a nozzle sidewall or nozzle threads 56RND and extends to an interior opening 58RND. The bottom wall is 80RND. It will be appreciated that these are just representative numbers to show that the various shapes have the same physical components or interlocking components as the principal design as shown in FIGS. 1-6.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An apparatus comprising:
  a. a blow molded bottle top first section and an injection molded container second bottom section;
  b. said blow molded bottle top section including a blow molded upper portion having a blow molded upper surface that extends to a cylindrical vertical nozzle having an exterior wall that contains threads, the cylindrical vertical nozzle exterior wall having a top wall that surrounds an opening leading to a cylindrical nozzle vertical interior wall surrounding a cylindrical vertical nozzle interior chamber that connects to a first interior chamber of the blow molded bottle top section, an insert having a top shelf resting on the top wall of the cylindrical vertical nozzle, the insert including at least one wall press-fit retained against the cylindrical nozzle vertical interior wall, the insert including a vertical interior opening which also connects to said first interior chamber;
  c. the blow molded bottle top section includes the blow molded upper portion extending to a blow molded edge which surrounds a blow molded vertical wall forming a blow molded shelf which extends to a blow molded lower portion including a curved wall section and a straight wall section terminating in a flat bottom wall, a blow molded bottle top section interior chamber is surrounded by interior walls of the blow molded upper portion, the blow molded lower portion, and an interior surface of the flat bottom wall;

d. said injection molded container second bottom section including an injection molded bottom wall and an injection molded circumferential sidewall extending to a top circumferential rim, the injection molded bottom wall and the injection molded circumferential wall surround an interior chamber leading to an open top surrounded by the top circumferential rim;

e. the lower portion of the blow molded bottle top section extending into said top opening of and is retained in said interior chamber of said injection molded second bottom section, the blow molded bottle top section and injection molded bottom section are retained together with the blow molded shelf resting on the top circumferential rim; and f. said injection molded container second bottom section includes adjacent its bottom wall four vertical prongs that pinch and retain a base of the bottom portion of the blow molded top section.

2. The apparatus in accordance with claim 1, further comprising:

each of the vertical prongs has a flat horizontal wall that extends to a prong edge that then extends vertically downwards and towards the outer circumferential vertical wall of said injection molded container second bottom section and ends at a first prong bottom spacer wall, the second vertical prong has a flat horizontal wall that extends to a prong edge that then extends vertically downwards and towards the outer circumferential vertical wall of said injection molded container second bottom section and ends at a second prong bottom spacer wall, the third vertical prong has a flat horizontal wall that extends to a prong edge that then extends vertically downwards and towards said outer circumferential vertical wall of said injection molded container second bottom section and ends at a third prong bottom spacer wall, the fourth vertical prong has a flat horizontal wall that extends to a prong edge that then extends vertically downwards and towards said outer circumferential vertical wall of said injection molded container second bottom section and ends at a fourth prong bottom spacer wall, said respective first, second, third and fourth prong edges grasp a respective sidewall of the bottom portion of a respective sidewall of the blow molded bottom top section.

3. The apparatus in accordance with claim 1, further comprising:

a. the blow molded lower portion of blow molded bottle top section has a vertical circumferential wall that surrounds a portion of said interior chamber and extends from a blow molded underneath shelf in an arced vertical direction on each of the sides of the lower portion of blow molded bottle first top section to a blow molded square base; and b. a transition from the arced vertical wall near the blow molded underneath shelf to blow molded square base is an inward transition such that a lower portion of the interior chamber is smaller than an upper portion of the interior chamber.

4. The apparatus in accordance with claim 1, further comprising:

a. contents are retained within the interior chamber of the blow molded bottle top section;

b. walls of the upper portion and lower portion of the blow molded bottle top section are transparent; and c. the circumferential sidewall of the injection molded bottom section is opaque.

5. The apparatus in accordance with claim 1, further comprising:

a. contents are retained within the interior chamber of the blow molded bottle top section;

b. walls of the upper portion and lower portion of the blow molded bottle top section are transparent;

c. the circumferential sidewall of the injection molded bottom section is opaque; and d. the contents are selected from the group consisting of nail polish, glue, perfume and cologne.

6. The apparatus in accordance with claim 1, further comprising:

a. said insert having a pair of cylindrical walls, a lower cylindrical wall integrally formed with an upper cylindrical wall which terminates in an upper shelf which surrounds said opening leading to said nozzle interior chamber; having an interior vertical surface; and b. said upper cylindrical wall sized to be press fit into the opening of said nozzle with the upper shelf sized to sit on an upper wall of the nozzle so that a bottom of the upper shelf rests on the upper wall of the nozzle while the upper cylindrical wall of the insert is press fit inside the interior vertical surface of the nozzle.

7. The apparatus in accordance with claim 6, further comprising: the lower cylindrical wall of said insert is formed in two sections separated by gaps between the two sections.

8. The apparatus in accordance with claim 1, further comprising:

a. a closing cap having a top with a sidewall and an interior chamber with an interior sidewall including threads which mate with threads on said cylindrical vertical nozzle; and b. a stem affixed to an interior wall of said top, the stem extending through the interior chamber of the closing cap, extending through the top interior chamber of said insert and terminating in an applicator extending into said interior chamber.

9. The apparatus in accordance with claim 1, further comprising: said blow molded bottle top first section is made of material selected from the group consisting of plastic and glass.

10. The apparatus in accordance with claim 1, further comprising: said injection molded container bottom section is made of material selected from the group consisting of thermoplastic, thermosetting polymers, elastomers and glass.

11. An apparatus comprising:

a. a blow molded bottle first top section and an injection molded container second bottom section;

b. said blow molded bottle first top section has a blow molded lower portion and a blow molded upper portion with said blow molded lower portion and said blow molded upper portion integrally formed together;

c. said blow molded upper portion including a blow molded top surface that extends upward to a nozzle having a central opening with a stabilizing insert retained in the opening, said stabilizing insert retained in the opening, said stabilizing insert including a longitudinal opening leading to an interior chamber of the bottle first upper section;

d. said blow molded upper surface also extends to a top surface edge which extends to a molded underneath shelf;

e. said blow molded lower portion has an arced vertical wall extending to a straight vertical wall terminating in a bottom wall;

f. interior surfaces of each of said blow molded bottom wall, and said vertical wall, said straight vertical wall, and said blow molded top surface together section, at a location of a bottom wall of the injection molded container bottom section; and g. said injection molded container second bottom section includes adjacent its bottom wall a multiplicity of vertical prongs that pinch and retain a base of the lower portion of the blow molded bottle top section.

12. The apparatus in accordance with claim 11, further comprising:

a. the blow molded lower portion of said blow molded bottle top section has a vertical circumferential wall that surrounds a portion of said interior chamber and extends from a blow molded underneath shelf in an arced vertical direction on each side of the lower portion of said blow molded bottle first top section to a blow molded square base; and b. a transition from the arced vertical wall near the blow molded underneath shelf to the blow molded square base is an inward transition such that a lower portion of the interior chamber is smaller than an upper portion of the interior chamber.

13. The apparatus in accordance with claim 11, further comprising:

a. contents is retained within the interior chamber of the blow molded bottle top section;

b. walls of the upper portion and lower portion of the blow molded bottle top section are transparent; and c. the injection molded sidewall of the injection molded bottom section is opaque.

14. The apparatus in accordance with claim 11, further comprising:

a. said stabilizing insert having a pair of cylindrical walls, a lower cylindrical wall integrally formed with an upper cylindrical wall which terminates in an upper shelf which surrounds said opening leading to said nozzle interior chamber; having an interior vertical surface; and b. said upper cylindrical wall sized to be press fit into the opening of said nozzle with the upper shelf sized to sit on an upper wall of the nozzle so that a bottom of the upper shelf rests on the upper wall of the nozzle while the upper cylindrical wall of the insert is press fit inside the interior vertical surface of the nozzle.

15. The apparatus in accordance with claim 11, further comprising:

a. a closing cap having a top with a sidewall and an interior chamber with an interior sidewall which mate with said nozzle; and b. a stem affixed to an interior wall of said top, the stem extending through the interior chamber of the closing cap, extending through the interior chamber of said insert and terminating in an applicator extending into said interior chamber.

16. An apparatus comprising:

a. a blow molded bottle first top section and an injection molded container second bottom section;

b. said blow molded bottle first top section has a blow molded lower portion and a blow molded upper portion with said blow molded lower portion and said blow molded upper portion integrally formed together;

c. said blow molded upper portion including a blow molded rounded upper surface that extends to a nozzle having a central longitudinal opening leading to a first interior chamber of the blow molded bottle;

d. said blow molded rounded upper surface also extends to a top surface edge which extends to a blow molded underneath shelf;

e. said blow molded lower portion has a bottom wall extending to sidewalls, said first interior chamber surrounded by interior walls of said blow molded upper portion and said blow molded lower portion;

f. said injection molded container second bottom section including an injection molded circumferential wall terminating in a top circumferential rim and an injection molded bottom wall, the injection molded circumferential wall and injection molded bottom wall surround a second interior chamber;

g. said lower blow molded portion of said blow molded bottle top section retained in said second interior chamber of said injection molded container, the top surface of said blow molded bottle first top section extending above said top circumferential rim of said injection molded container second bottom section;

h. the upper portion of said blow molded bottle first top section is visible and the lower portion of said blow molded bottle first top section is not visible through the circumferential wall of the injection molded container second bottom section when the blow molded bottle first top section and injection molded container second bottom section are retained together; and i. said injection molded container second bottom section includes adjacent its bottom wall four vertical prongs that pinch and retain a base of the bottom portion of the blow molded bottom top section.

17. The apparatus in accordance with claim 16, further comprising:

a. the blow molded lower portion of said blow molded bottle top section has a vertical circumferential wall that surrounds a portion of said first interior chamber and extends from the blow molded underneath shelf in a slightly arced vertical direction on each of the sides of the lower portion of said blow molded bottle first top section to a blow molded square base; and b. a transition from the arced vertical wall near the blow molded underneath shelf to a blow molded square base is an inward transition such that a lower portion of the interior chamber is smaller than an upper portion of the interior chamber.

18. An apparatus comprising:

a. a blow molded bottle first top section and an injection molded container second bottom section;

b. said blow molded bottle first top section has a blow molded lower portion and a blow molded upper portion with said blow molded lower portion and said blow molded upper portion integrally formed together;

c. said blow molded upper portion including a blow molded top surface that extends to a nozzle having a central longitudinal opening leading to an interior chamber of the blow molded bottle first upper section;

d. a stabilizing insert within said interior chamber of said nozzle;

e. said stabilizing insert having a pair of cylindrical walls, a lower cylindrical wall integrally formed with an upper cylindrical wall which terminates in said upper shelf which surrounds said opening leading to said interior chamber surrounded by both the upper cylindrical wall and the lower cylindrical wall;

f. said upper cylindrical wall sized to be press fit into the opening of the nozzle with the upper shelf sized to sit on the upper wall of the nozzle so that a bottom of the upper shelf rests on the upper wall of the nozzle while the upper cylindrical wall of the insert is press fit inside the interior vertical surface of the nozzle;

g. said blow molded upper surface also extends to a top surface edge which extends to a blow molded underneath shelf;

h. said blow molded lower portion has a bottom wall extending to sidewalls which surround a first interior chamber;

i. said injection molded container second bottom section including an injection molded circumferential wall terminating in a top circumferential rim and an injection molded bottom wall, the injection molded circumferential wall and injection molded bottom wall surround a second interior chamber;

j. said lower blow molded portion of said blow molded bottle top section retained in said second interior chamber of said injection molded container, the top surface of said blow molded bottle first top section extending above said top circumferential rim of said injection molded container second bottom section; and k. the upper portion of said blow molded bottle first top section is visible and the lower portion of said blow molded bottle first top section is not visible through the circumferential wall of the injection molded container second bottom section when the blow molded bottle first top section and injection molded container second bottom section are retained together.

* * * * *